US008527555B2

(12) United States Patent
Benitez et al.

(10) Patent No.: US 8,527,555 B2
(45) Date of Patent: Sep. 3, 2013

(54) DEVICE AND METHOD FOR GENERATING A MEDIA PACKAGE

(75) Inventors: Ana Belen Benitez, Los Angeles, CA (US); Kurt Clawson, Burbank, CA (US); Christopher Carey, Santa Clarita, CA (US)

(73) Assignee: Thomson Licensing, Boulogne (FR)

( * ) Notice: Subject to any disclaimer, the term of this patent is extended or adjusted under 35 U.S.C. 154(b) by 788 days.

(21) Appl. No.: 12/224,202

(22) PCT Filed: Dec. 6, 2006

(86) PCT No.: PCT/US2006/046526
§ 371 (c)(1),
(2), (4) Date: Aug. 19, 2008

(87) PCT Pub. No.: WO2007/100367
PCT Pub. Date: Sep. 7, 2007

(65) Prior Publication Data
US 2009/0030924 A1  Jan. 29, 2009

Related U.S. Application Data

(60) Provisional application No. 60/778,052, filed on Mar. 1, 2006.

(51) Int. Cl.
*G06F 17/30* (2006.01)
(52) U.S. Cl.
CPC ....... *G06F 17/30056* (2013.01); *Y10S 707/913* (2013.01)
USPC ........... 707/805; 707/695; 707/825; 707/913; 717/104
(58) Field of Classification Search
CPC ................................................ G06F 17/30056

USPC ................ 707/803, 913, 914, 915, 916, 805, 707/825, 695; 717/104
See application file for complete search history.

(56) References Cited

U.S. PATENT DOCUMENTS 7,032,816 B2 *  4/2006  Markham et al. ............. 235/376
7,277,959 B2   10/2007  Miyamoto et al.
(Continued)

FOREIGN PATENT DOCUMENTS

JP  2005020329  1/2005
JP  2003101988  7/2005
(Continued)

OTHER PUBLICATIONS

Correspondence from European Patent Operations, Boulogne Cedex France dated Jan. 30, 2009.

*Primary Examiner* — Shahid Alam
(74) *Attorney, Agent, or Firm* — Robert D. Shedd; Vincent E. Duffy; Michael A. Pugel

(57) ABSTRACT

A device and method direct towards the packaging, transporting and extracting of essence files, metadata files and service data files are provided. The device and method include receiving content files (e.g., essence and metadata files) and service files, the service files identifying an application to be applied to the content files, combining the content files and the service files into a media package, and transmitting the media package. The device and method also include receiving the media package containing content files and service files and extracting the content files and the service files from the media package. The media package may further include command data that describes how to process the content files and the service files as well as identification data that identifies the content files and service files. The command data, and content and service files may be encrypted.

7 Claims, 5 Drawing Sheets

(56) References Cited

U.S. PATENT DOCUMENTS

| | | |
|---|---|---|
| 7,357,298 B2 * | 4/2008 | Pokorny et al. ............... 235/375 |
| 7,478,163 B2 * | 1/2009 | Alda et al. ................... 709/229 |
| 7,882,438 B2 * | 2/2011 | Markham et al. ............. 715/736 |
| 8,046,341 B2 | 10/2011 | Shinkai et al. |
| 2002/0032603 A1 * | 3/2002 | Yeiser ............................. 705/14 |
| 2002/0035481 A1 * | 3/2002 | Neulight ........................... 705/1 |
| 2002/0104093 A1 | 8/2002 | Buehl et al. |
| 2002/0116471 A1 | 8/2002 | Shteyn |
| 2003/0009425 A1 * | 1/2003 | Stonedahl et al. ............... 705/51 |
| 2003/0191816 A1 * | 10/2003 | Landress et al. ............. 709/219 |
| 2005/0108486 A1 | 5/2005 | Sandorfi |
| 2008/0016491 A1 * | 1/2008 | Doepke ........................ 717/104 |

FOREIGN PATENT DOCUMENTS

| | | |
|---|---|---|
| JP | 2005198204 | 7/2005 |
| WO | WO0243396 | 5/2002 |
| WO | WO2005101837 | 10/2005 |

* cited by examiner

DEVICE AND METHOD FOR GENERATING A MEDIA PACKAGE

This application claims the benefit under 35 U.S.C. §365 of International Application PCT/US2006/046526, filed Dec. 6, 2006, which was published in accordance with PCT article 21(2) on Sep. 7, 2007, in English and which claims the benefit under 35 U.S.C.§119 of a provisional application 60/778,052 filed in the United States on Mar. 1, 2006.

TECHNICAL FIELD OF THE INVENTION

The present invention generally relates to packaging and transporting data, and more particularly, to a system and method for packaging, transporting and extracting essence files, metadata files and service data files using an intelligent edge device.

BACKGROUND OF THE INVENTION

The conventional movie production process involves passing media data (e.g., images and audio) between production facilities using portable physical media such as tape assets. Although physical systems based on tape assets have been around for a long time, the movement of tape assets between facilities is cumbersome and expensive. As a result, there have been some efforts in the movie industry towards building the equivalent systems in the electronic and digital domain. In other words, the movie industry is attempting to transition from physical media formats and paper trails of data to the exchange of non-physical media and related electronic data. However, the efforts have encountered a number of drawbacks. For example, while physical media is clearly defined by its physical form (e.g., Beta, DigiBeta, D1, D5), non-physical content has no easily identifiable form and is therefore less understood or recognized. Furthermore, the security of content becomes more critical as ownership of the content no longer implies direct possession or control of the content. Finally, an industry standard for packaging of related content does not exist. Due to the drawbacks, the transition from an exchange of physical assets to an exchange of electronic assets is feeding industry instability.

The present invention is directed towards overcoming these drawbacks.

SUMMARY

The present disclosure is directed towards a device and method for packaging, transporting and extracting of essence files, metadata files and service data files are provided. The device and method include receiving content files (e.g., essence and metadata files) and service files, the service files identifying an application to be applied to the content files, combining the content files and the service files into a media package, and transmitting the media package. The device and method also include receiving the media package containing content files and service files and extracting the content files and the service files from the media package. The media package may further include command data that describes how to process the content files and the service files as well as identification data that identifies the content files and service files. The command data, content files and service file may be encrypted.

According to one aspect of the present disclosure, a method for generating a media package includes receiving content files and service files, the service files identifying an application to be applied to the content files, and combining the content files and the service files into a media package.

According to another aspect of the present disclosure, a method of processing a media package includes receiving a media package, the media package containing content files and service files, the service files identifying an application to be applied to the content files, and extracting the content files and the service files from the media package.

According to yet another aspect of the present disclosure, a media package includes at least one content file, and at least one service file, the service file identifying an application to be applied to the content file.

According to a further aspect of the present disclosure, a device for generating a media package includes a means for receiving content files and service files, the service files identifying an application to be applied to the content files, a means for generating command data describing how to process the content files and the service files, a means for encrypting the command data, the content files and the service files, a means for generating identification data associated with the encrypted content files and the encrypted service files, and a means for combining the identification data, the encrypted command data, the encrypted content files, and the encrypted service files into a media package.

According to a still further aspect of the present disclosure, a device for processing a media package includes means for receiving a media package, the media package containing encrypted content files, encrypted service files identifying an application to be applied to the encrypted content files, encrypted command data describing how to process the encrypted content files and the encrypted service files, and identification data identifying the encrypted content files and the encrypted service files, means for decrypting the encrypted content files, the encrypted service files, and the encrypted command data, and means for extracting the decrypted content files and the decrypted service files from the media package in accordance with the identification data and the decrypted command data.

BRIEF DESCRIPTION OF THE DRAWINGS

These, and other aspects, features and advantages of the present invention will be described or become apparent from the following detailed description of the preferred embodiments, which is to be read in connection with the accompanying drawings.

In the drawings, wherein like reference numerals denote similar elements throughout the views.

Figure 1:
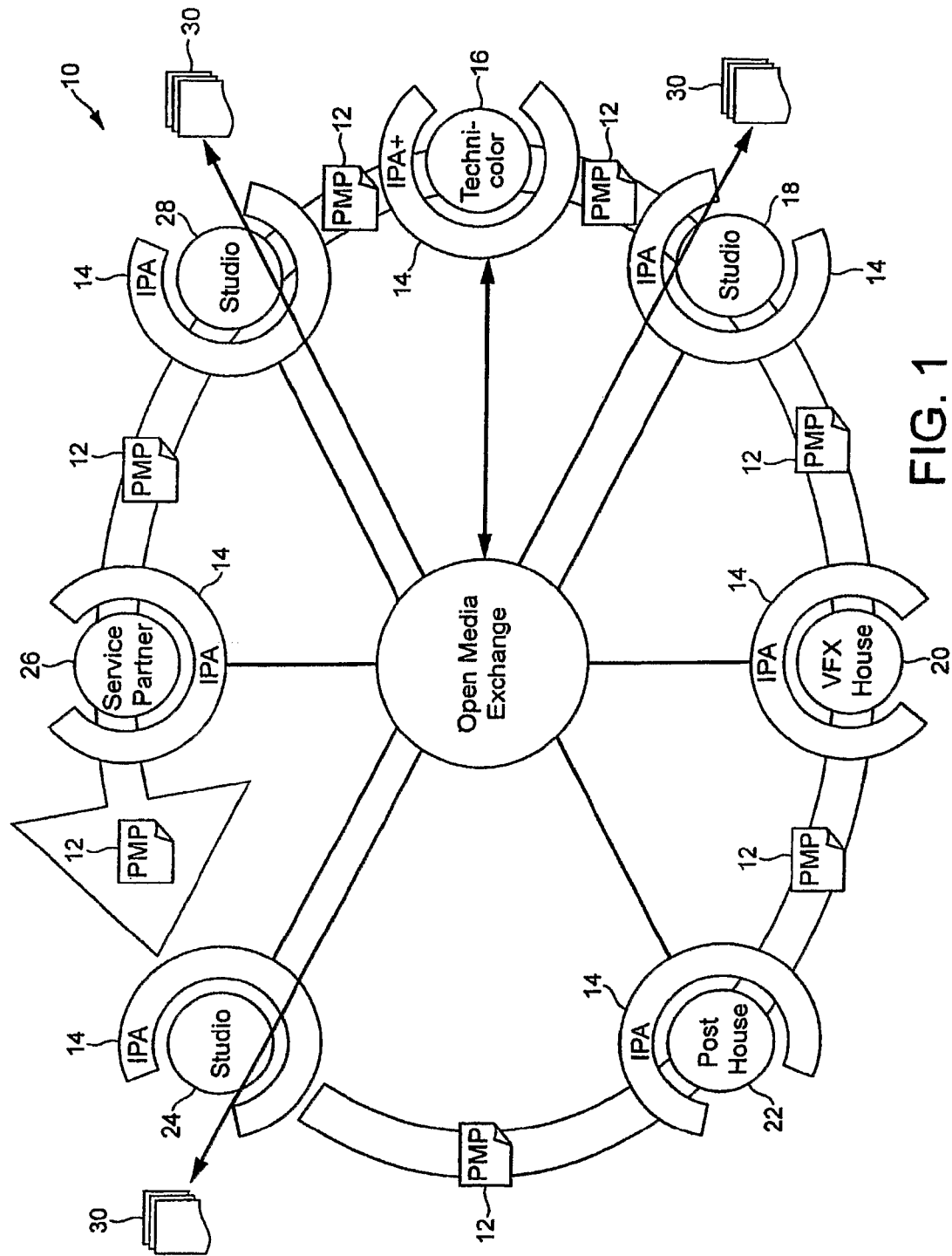
FIG. 1 is an illustration of an exemplary network using portable media packages and intelligent process adapters according to an aspect of the present invention.

It should be understood that the drawing(s) is for purposes of illustrating the concepts of the invention and is not necessarily the only possible configuration for illustrating the invention.

DETAILED DESCRIPTION OF PREFERRED EMBODIMENTS

It should be understood that the elements shown in the Figures may be implemented in various forms of hardware, software or combinations thereof. Preferably, these elements are implemented in a combination of hardware and software on one or more appropriately programmed general-purpose devices, which may include a processor, memory and input/output interfaces.

The present description illustrates the principles of the present invention. It will thus be appreciated that those skilled in the art will be able to devise various arrangements that, although not explicitly described or shown herein, embody the principles of the invention and are included within its spirit and scope.

All examples and conditional language recited herein are intended for pedagogical purposes to aid the reader in understanding the principles of the invention and the concepts contributed by the inventors to furthering the art, and are to be construed as being without limitation to such specifically recited examples and conditions.

Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams presented herein represent conceptual views of illustrative circuitry embodying the principles of the invention. Similarly, it will be appreciated that any flow charts, flow diagrams, state transition diagrams, pseudocode, and the like represent various processes which may be substantially represented in computer readable media and so executed by a computer or processor, whether or not such computer or processor is explicitly shown.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor ("DSP") hardware, read only memory ("ROM") for storing software, random access memory ("RAM"), and nonvolatile storage.

Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

In the claims hereof, any element expressed as a means for performing a specified function is intended to encompass any way of performing that function including, for example, a) a combination of circuit elements that performs that function or b) software in any form, including, therefore, firmware, microcode or the like, combined with appropriate circuitry for executing that software to perform the function. The invention as defined by such claims resides in the fact that the functionalities provided by the various recited means are combined and brought together in the manner which the claims call for. It is thus regarded that any means that can provide those functionalities are equivalent to those shown herein.

Referring now to FIG. 1, an exemplary network 10 (e.g., a connectivity and exchange network) using media packages such as portable media packages (PMPs) 12 and intelligent edge devices such as intelligent process adapters (IPAs) 14 is shown. The PMP 12 is a packaging scheme enabling the exchange of non-physical media and related data. The IPAs 14 enable direct exchange of media content between facilities 16-28 having disparate systems by managing the normalization of content and related data, and by providing common tools for creating and reading PMPs 12.

In operation, digital essence, metadata and service data are wrapped as a PMP 12 by an IPA 14 at a first facility. The PMP 12 is then transmitted to a different facility. The IPA 14 at the receiving facility unwraps the PMP 12 and, additionally, it can provide special processing operations such as metadata translation. For example, the background plates, the metadata, and the work description for a VFX shot may be wrapped and sent as a PMP 12 from a post house 22 to a VFX house 20 through IPAs 14. Once the VFX shot is finished, then, it can be sent back to the post house 22 in an analogous way.

Some benefits to utilizing the network 10 include, but are not limited to, the automation of value add business applications 30 such as waybill management, review-approval, data schema mapping, and project tracking and management. More specifically, the IPAs 14 provide a framework where a developer can create applications that support business solutions by orchestration of their business workflow. While these business applications may exist without IPAs 14 or PMPs 12, the use of IPAs 14 and PMPs 12 allow the automation of business processes that are conventionally carried out as a set of manual steps. In other words, IPAs 14 and PMPs 12 may be used for process automation. For example, there may be a set of processes which require a quality check (QC) step to be performed and that is performed at another facility. Conventionally, the manual process includes creating a video tape, delivering the video tape to the QC facility and the QC operator putting the tape into a deck and performing the QC operation. The operator needs to inform someone of the results, perhaps by phone, e-mail or sending the QC report back to the requesting facility. However, by packaging the essence, video, and service data or work instructions into a PMP 12 and sending it to an IPA 14 in the QC facility, automation can speed the QC process. More specifically, the IPA 14 receives the PMP 12, unwraps the contents and determines, by processing the work instructions or service data in the PMP 12, that there is a QC operation that needs to take place on the video essence. The IPA 14 may then place the video essence on a QC workstation and send an electronic notification to the QC operator. After the QC operator performs the QC action on the video essence, the operator fills out a QC report, packages the report in a PMP 12 and sends PMP 12 back to the requesting facility. The requesting facility's IPA 14 receives and unwraps the PMP 12, determines that the PMP 12 is a continuation of a previous workflow, and pushes the results of the QC report along to the appropriate next step in the workflow.

Figure 2:
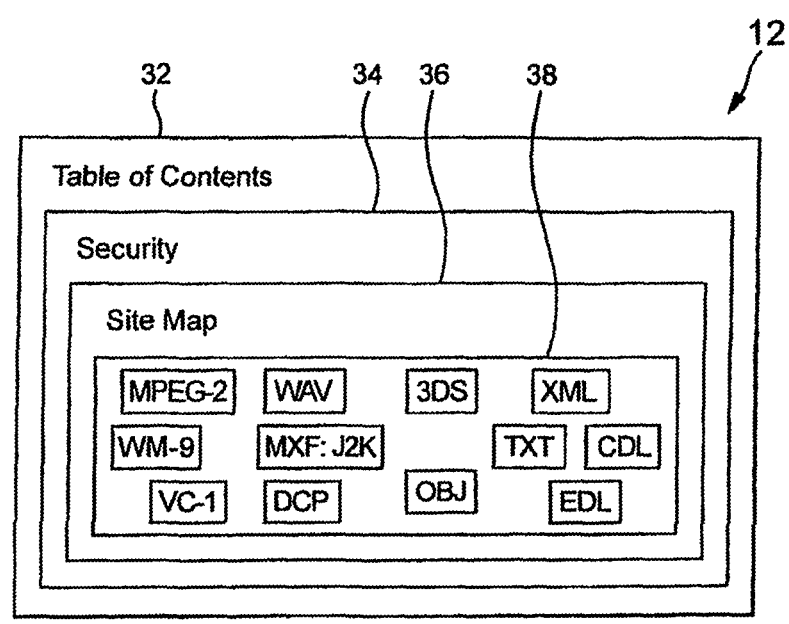
FIG. 2 is a diagram of an exemplary portable media package according to an aspect of the present invention.

Referring now to FIG. 2, an exemplary PMP 12 is shown. The PMP 12 is an extensible and secure packaging scheme for digital essence, metadata and service data (e.g., application data such as purchase order, waybills, etc). The digital data is packaged and exchanged between facilities 16-28 to accomplish a specific service such as, but not limited to, VFX compositing, color correction, version generation and the like.

As discussed above, the PMP 12 contains content files (i.e., essence and metadata files) and service data files. The outer layer of the PMP 12 is the table of contents layer 32 containing identification data. More specifically, the table of contents layer 32 provides generic, unsecured information about the PMP 12 such as a brief description of the PMP 12 and a list of files contained therein. The next layer of the PMP 12 is the security layer 34. The security layer 34 secures and protects the rest inner layers of the PMP 12 including the site map layer 36 and the individual files 38. The site map 36 contains command data that describes each file 38 in the PMP 12, the relations between the files 38, and any special processing instructions to be executed by the receiving IPA 14. It should be noted that the servicing a specific project or order (e.g., a VFX request) may involve the processing of several PMPs 12 that will be uniquely numbered or identified.

PMPs 12 package any data files 38 that might need to be exchanged between facilities 16-28 to accomplish a specific service or application in media and entertainment workflows such as VFX compositing and color correction. Three different types of data files 38 are essence data files, metadata files, and service data files.

Essence is digital material of any modality such as images and audio. PMPs 12 package essence files of any type and in any format. For example, PMPs 12 can package images, videos, audio, computer graphics, and the like. PMPs 12 don't restrict the file formats of essence either. For example, essence can be in formats such as, but not limited to, DPX, JPEG, GIF, OpenEXR, MPEG-2, VC-1, and OBJ.

Metadata is "data about data". In a PMP 12, metadata is used to describe the essence files. Similar to essence files, the PMP 12 is agnostic of the type and format of the metadata it packages. For example, the PMP 12 can package synchronization metadata in MXF, QuickTime and SMIL formats, cut lists in EDL and FleX formats, color corrections as ASC CDLs, and right management information as XRML files. Rich file formats such as MXF can be used for both metadata and essence.

Service data corresponds to the description of the actual service or application that needs to be accomplished in the exchange. Service data includes the purchase order, special handling or processing instructions for the receiving facility 16-28, and service description. Since there are no standard formats for service data, PMPs 12 preferably provide a human-readable and machine-readable format for service data preferably based on XML.

An example of a service-data file is shown below. A service may be described with several metadata attributes (e.g., identifier and description), the purchase or work order, and a group of instructions to be executed at the receiving facility 16-28. In the service-data file below, elements that start with "dc:" and "dcterms:" operate in accordance with the Dublin Core Metadata Initiative (DCMI) and elements that start with "rp210Elements:" operate as set forth in the Society of Motion Picture and Television Engineers (SMPTE) Metadata Dictionary (RP210).

```
<serviceData>
    <!-- Service' metadata attributes -->
    <dc:title> When Pink Elephants Fly </dc:title>
    <dc:identifier> 34.45.56.78 </dc:identifier>
```

-continued

```
    <dc:description> VFX compositing job from Disney to MPC
through TCS </dc:description>
    <!-- Generic fields for purchase orders -->
    <order>
    <client> Disney </client>
    <clientBarcode> 434354235435 <clientBarcode>
    <clientPO> ... </clientPO>
    <receivedFrom> John Smith </receivedFrom>
    <receivedBy> John Doe </receivedBy>
    <provider> MPC </provider>
    <dcterms:mediator> TES </dcterms:mediator>
    <dc:description> VFX compositing needed for one shot
</dc:description>
    <dcterms:dateSubmitted> Jan 22, 2006
</dcterms:dateSubmitted>
    </order>
    <!-- Group of instructions -->
    <instructions>
    <instruction> Be careful with this. Do that. And do not
forget to send it back when you are done. </instruction>
    </instructions>
</serviceData>
```

As discussed above, the data files in a PMP 12 are wrapped by several files or layers 32, 34, 36, the "wrapper files", that are also part of the PMP 12. The wrapper files summarize, secure, and describe the files in a PMP 12. PMPs 12 preferably have three types of wrapper files: the table of contents 32, security files 34, and the site map 36. The wrapper files 32-36 may be identified in a wrapper file directory in the PMP 12.

A PMP 12 has one table of contents 32 containing identification data that provides generic, open information about the PMP 12. The table of contents 32 includes the list of data files 38 in the PMP 36 with their corresponding types, a brief description about the PMP 12 and its purpose, and the information necessary to access any secured file of the PMP 12. The table of contents 32 is preferably in a human-readable and machine-readable format preferably based on XML.

The table of contents 32 is preferably the first or the last file in the PMP 12. An example of a table-of-contents file 32 is shown below. The table of contents 32 includes the generic description of the PMP 12 with some metadata attributes and the list of files 38 in the PMP 12. Each file 38 in the PMP 12 is briefly described with some basic metadata attributes (e.g., identifier, type, path and key identifier). In the table-of-contents file below, elements that start with "dc:" and "dcterms:" operate in accordance with the DCMI and elements that start with "rp210Elements:" operate as set forth in the SMPTE Metadata Dictionary (RP210).

```
<tableOfContents>
    <package>
    <!-- Package's metadata attributes -->
    <dc:identifier> 45.66.89.45.77 </dc:identifier>
    <dc:description> VFX compositing job from Disney to MPC
through TCS </dc:description>
    <dc:creator> TES </dc:creator>
    <dcterms:created> Jan 22, 2006 </dcterms:created>
    <deliveryDate> Jan 23, 2006 </deliveryDate>
    <dc:identifier> <indexPart> 1 of 2 </indexPart>
</dc:identifier>
    <dcterms:isPartOf> 45.66.89.45.70 </dcterms:isPartOf>
    <!-- List of files in the package -->
    <items>
        <item resource="toc"/>
        <item resource="security"/>
        <item resource="sitemap"/>
        <item resource="file1"/>
        <item resource="file2"/>
        <item resource="file3"/>
```

-continued

```
        </items>
    </package>
    <!-- Generic metadata attributes for each file -->
    <!-- including the table-of-contents and site-map files -->
    <file about ="toc">
        <dc:identifier> toc </dc:identifier>
        <dc:type> Table of Contents </dc:type>
        <path> WRAPPER-FILES/PMP-TableOfContents.xml </path>
    </file>
    <file about ="security">
        <dc:identifier> security </dc:identifier>
        <dc:type> Security </dc:type>
        <path> WRAPPER-FILES/PMP-Security.xml </path>
    </file>
    <file about ="sitemap">
        <dc:identifier> sitemap </dc:identifier>
        <dc:type> Site Map </dc:type>
        <path> WRAPPER-FILES/PMP-SiteMap.xml </path>
        <keyId> 01.01.01.00 </keyId>
    </file>
    <file about ="file1">
        <dc:identifier> file1 </dc:identifier>
        <dc:type> Image </dc:type>
        <path> directory1/file1.dpx </path>
        <keyId> 01.01.01.01 </keyId>
    </file>
    <file about ="file2">
        <dc:identifier> file2 </dc:identifier>
        <dc:type> Image </dc:type>
        <path> directory2/file2.dpx </path>
        <keyId> 01.01.01.02 </keyId>
    </file>
    <file about ="file3">
        <dc:identifier> file3 </dc:identifier>
        <dc:type> ASC CDL </dc:type>
        <path> metadata/ASCCDL.xml </path>
        <keyId> 01.01.01.03 </keyId>
    </file>
</tableOfContents>
```

All the files in a PMP 12 may be protected and authenticated through redundancy checks, hash values, and other digital signatures. In addition, all the files, except for the table of contents 32 and security file 34, can be further secured through a combination of symmetric and public key encryption. A PMP 12 may have a security file 34 that includes the digital signatures and encrypted keys that protect and secure the PMP 12 and its files 38. The security file 34 is preferably in a human-readable and machine-readable format preferably based on XML.

One process of encrypting a file may be as follows: the file would be first encrypted using a symmetric key, e.g., in accordance with the Advanced Encryption Standard (AES), and then the symmetric key would be encrypted using a private and public key pair, e.g., using Rivest, Shamir and Adleman (RSA) encryption. Since one PMP 12 could be sent to multiple facilities 16-28, the symmetric keys may need to be encrypted with multiple private and public key pairs. PMPs 12 and individual files could also be password protected.

The name of the security file 34 in the PMP 12 may not be pre-defined. Instead, the security file 34 may be identified as the file with type "PMP Security" in the table-of-contents file 32. The table-of-contents file 32 can also include references to the keys, redundancy checks, and hash values for the individual files.

An example of a security file 34 is included below. It includes information about the signer of the PMP 12, the encrypted keys needed to decrypt the PMP 12 and individual files, and the digital signatures of the signer field, the encrypted-key field, and the data and wrapper files in the PMP 12. In the security file below, elements that start with "enc:" and "ds:" operate in accordance with the World Wide Web Consortium's (W3C) XML Encryption and Signature recommendations, respectively.

```
<security>
    <!-- Entity signing the file and generating the encrypted
keys -->
    <signer id="signer"> ... </signer>
    <!-- List of encrypted keys -->
    <!-- These include the keyId for each file included in
the table of contents -->
    <encryptedKeys id="keys">
        <enc:encryptedKey> ... </enc:encryptedKey>
        <enc:encryptedKey> ... </enc:encryptedKey>
        <enc:encryptedKey> ... </enc:encryptedKey>
        <enc:encryptedKey> ... </enc:encryptedKey>
    </encryptedKeys>
    <!-- Digital signatures for the elements above, the data
files, and the wrapper files -->
    <ds:Signature> ... </ds:Signature>
</security>
```

Each PMP 12 has one site map 36 containing command data that provides detailed information about the data files 38 in the PMP 12. The site map 36 may provide rich information about the data files 38 such as file name, type, creator, title, unique identifier, digital signature, and the like. In addition, the site map 36 describes the relations between the data files (e.g., an American Society of Cinematographers (ASC) Color Decision List (CDL) file provides color corrections for an identified group of images). Finally, the site map 36 may also include special processing instructions (e.g., an instruction to insert a watermark into image files for forensic tracking or an instruction to convert files from one format to another format) to be executed by the receiving IPA 14. The site map 36 is preferably in a human-readable and machine-readable format preferably based on XML.

An example of a site map file 36 is provided below. The site map file 36 includes a detailed description of the PMP 12 with metadata attributes and the list of files 38 in the PMP 12. Each file 38 in the PMP 12 may be extensively described with rich metadata attributes (e.g., format, width and height, creator, creation date, etc.). In the site map file below, elements that start with "dc:" and "dcterms:" operate in accordance with the DCMI.

```
<sitemap>
    <package>
        <!-- Package's metadata attributes -->
        <dc:title> When Pink Elephants Fly </dc:title>
        <dc:identifier> 45.66.89.45.77 </dc:identifier>
        <dc:description> VFX compositing job from Disney to MPC
through TCS </dc:description>
        <dc:creator> TES </dc:creator>
        <dcterms:created> Jan 22, 2006 </dcterms:created>
        <dc:identifier>
            <rp210Elements:UMID> urn:oid:1.2.33.4.5...
</rp210Elements:UMID>
        </dc:identifier>
        <!-- Special processing Instructions for automation -->
        <instructions>
            <instruction type="automatic">
                <convert>
                    <inputFormat> MPEG-2 </inputFormat> <outputFormat> J2K
</outputFormat>
                </convert>
            </instruction>
        </instructions>
        <!-- List of items in the package including bundles and
files -->
```

-continued
```
    <items>
        <item resource="toc"/>
        <item resource="security"/>
        <item resource="sitemap"/>
        <item resource="file1"/>
        <item resource="file2"/>
        <item resource="file3"/>
        <item resource="bundle1"/>
    </items>
</package>
<!-- Metadata attributes for each file -->
<!-- including the table-of-contents and site-map files -->
<item about ="toc">
    <dc:identifier> toc </dc:identifier>
    <dc:type> Table of Contents </dc:type>
    <path> WRAPPER-FILES/PMP-TableOfContents.xml </path>
    <dc:creator> TES </dc:creator>
    <dcterms:created> Jan 22, 2006 </dcterms:created>
    <dc:descripton> Table of contents for order 123
</dc:description>
</item>
<item about ="sitemap">
    <dc:identifier> sitemap </dc:identifier>
    <dc:type> Site Map </dc:type>
    <path> WRAPPER-FILES/PMP-SiteMap.xml </path>
    <keyId> 01.01.01.00 </keyId>
    <dc:creator> TES </dc:creator>
    <dcterms:created> Jan 22, 2006 </dcterms:created>
    <dc:descripton> Site map for order 123 </dc:description>
</item>
<item about ="file1">
    <dc:identifier> file1 </dc:identifier>
    <dc:type> Image </dc:type>
    <path> directory1/file1.dpx </path>
    <keyId> 01.01.01.01 </keyId>
    <dc:creator> TES </dc:creator>
    <dcterms:created> Jan 21, 2006 </dcterms:created>
    <dc:descripton> Background plate for shot: frame 1
</dc:description>
    <dcterms:extent>
        <rp210Elements:sampledWidth> 4096
</rp210Elements:sampledWidth>
        <rp210Elements:sampledHeight> 3112
</rp210Elements:sampledHeight>
    </dcterms:extent>
    <dc:format> image/x-dpx </dc:format>
    <dcterms:isPArtOf> bundle1 </dcterms:isPArtOf>
</item>
<item about ="file2">
    <dc:identifier> file2 </dc:identifier>
    <dc:type> Image </dc:type>
    <path> directory2/file2.dpx </path>
    <keyId> 01.01.01.02 </keyId>
    <dc:creator> TES </dc:creator>
    <dcterms:created> Jan 21, 2006 </dcterms:created>
    <dc:descripton> Background plate for shot: frame 2
</dc:description>
    <dcterms:extent>
        <rp210Elements:sampledWidth> 4096
</rp210Elements:sampledWidth>
        <rp210Elements:sampledHeight> 3112
</rp210Elements:sampledHeight>
    </dcterms:extent>
    <dc:format> image/x-dpx </dc:format>
    <dcterms:isPArtOf> bundle1 </dcterms:isPArtOf>
</item>
<item about ="file3">
    <dc:identifier> file3 </dc:identifier>
    <dc:type> ASC CDL </dc:type>
    <path> metadata/ASCCDL.xml </path>
    <keyId> 01.01.01.03 </keyId>
    <dc:creator> TES </dc:creator>
    <dcterms:created> Jan 21, 2006 </dcterms:created>
    <dc:descripton> ASC CDL for frames 1 and 2
</dc:description>
    <dcterms:isPArtOf> bundle1 </dcterms:isPArtOf>
</item>
<item about ="bundle1">
    <dc:identifier> bundle1 </dc:identifier>
    <dc:type> Group of files </dc:type>
```

-continued
```
    <!-- List of files in the bundle -->
    <items>
        <item resource="file1">
        <item resource="file2">
        <item resource="file3">
    </items>
    </item>
</sitemap>
```

Data and wrapper files (encrypted or not, as applicable) may be archived or combined into a single PMP 12 using existing archive file formats as known by those skilled in the art. For example, the Tape ARchive format (tar) is an archive file format compliant with the Portable Operating System Interface for uniX (POSIX) standards. More specifically, POSIX.1-1998 and later POSIX.1-2001. Tar is may be used to archive and unarchive files while preserving file system information such as user and group permissions, dates, and directory structures.

A tar file is the concatenation of one or more files. Each file is preceded by a header block. The file data is written unaltered except that its length is rounded up to a multiple of 512 bytes and the extra space is filled with zeros. The end of an archive is marked by at least two consecutive zero-filled blocks. The file header block contains metadata about a file (e.g., file name, size, owner, etc.). A directory is indicated by having a trailing slash(/) in the name. To ensure portability across different architectures with different byte orderings, the information in the header block is preferably encoded in ASCII.

Although a tar file can preserve file system information such as user and group permissions, dates, and directory structures can be preserved for the individual files, tar files may not always be appropriate for creating and/or extracting PMPs 12. For example, the data files 38 could come from multiple file systems and have all permissions limited to a local user. In this case, preserving the directory structures and user permissions would result in the inability to copy and modify the files 38 at the receiving facility 16-28. Therefore, IPAs 12 under operator supervision should appropriately set and manage the file system information at the sending and receiving facilities 16-28.

The tar archive file format permits the partial restore, modification, and online packaging of PMPs 12. A file in a PMP 12 having a tar archive file format can be extracted from the PMP 12 without having to extract all the files in the PMP 12. In addition, files can be easily added or removed from a PMP 12 in the tar archive file format. Finally, since tar archive files are sequential in nature, once the individual files are available, the PMP 12 can be created and transmitted on the fly without the need for saving or buffering the entire PMP 12.

As discussed above, since PMPs 12 are created and read by many different systems in diverse computing environments, human-readable and machine-readable formats, preferably based on XML, are utilized. One reason XML is preferable is that support for XML is increasing in the media and entertainment industry (e.g., the industry's use of XML for Digital Cinema Packages). Although the XML format is preferable, other formats such as, but not limited to, the plain text format, the binary format, and the key/length/value (KLV) format may be used.

Figure 3:
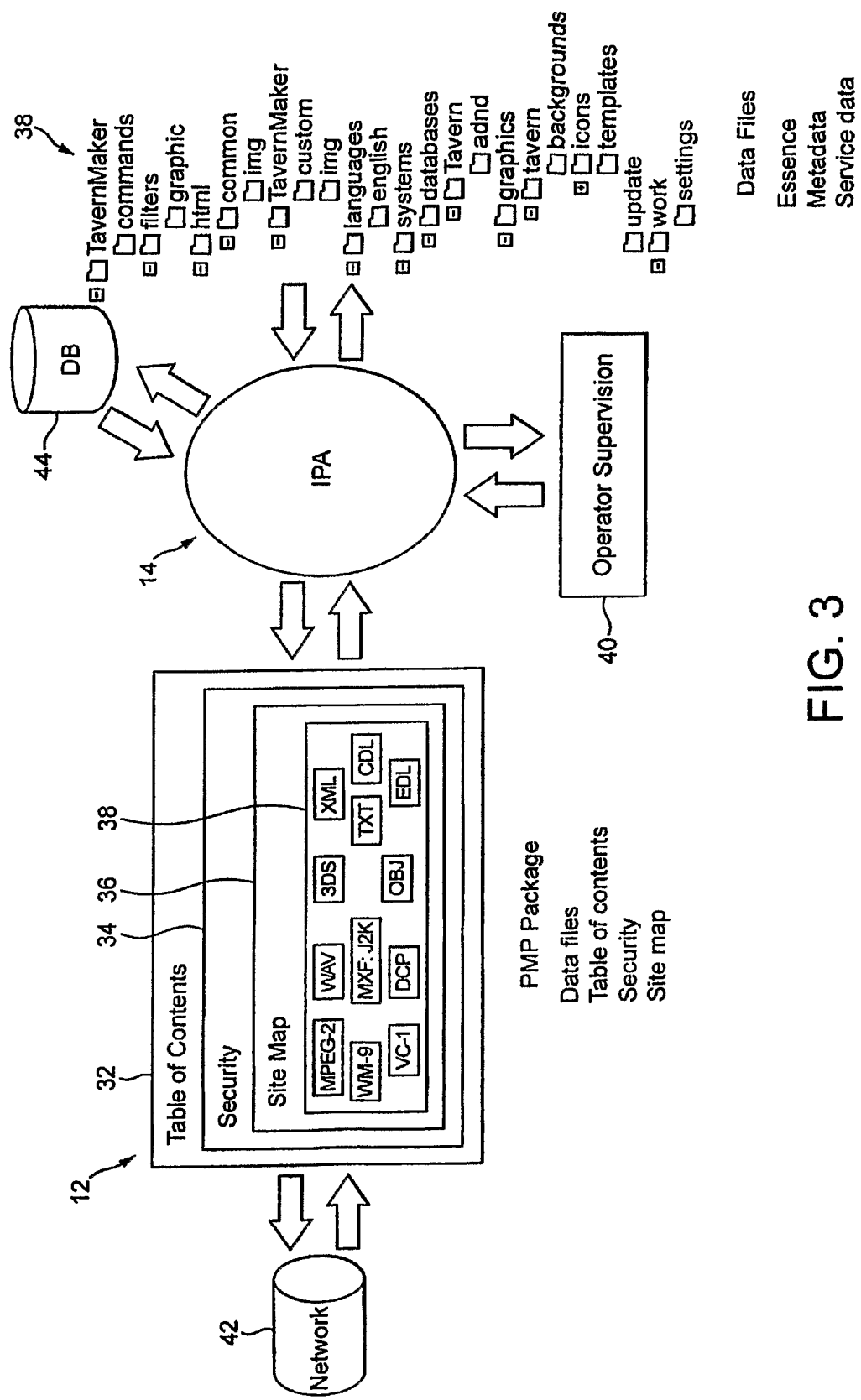
FIG. 3 is a diagram of an exemplary intelligent process adapter according to an aspect of the present.

Referring now to FIG. 3, an example of an IPA device 14 that creates, extracts, sends, and receives PMPs 12 under operator supervision 40 is shown. As previously discussed, PMPs 12 are created to satisfy specific purchase orders, i.e., to send a group of data files over a network 42 from one facility to another facility for a specific service. After receiving a purchase order, the IPA 14 locates, prepares, encrypts, wraps and packages the necessary data files 38 with a table of contents 32 and a site map 36. The metadata needed for describing the individual data files may need to be retrieved from an external database 44 or entered manually by the operator 40. After the IPA 14 creates the PMP 12, the PMP 12 is sent to the destination facility's IPA 14. The receiving IPA 14 decrypts and extracts the necessary data files 38 (i.e., essence files, metadata files and service data files) from the received PMP 12. In addition to creating, extracting, sending, and receiving PMPs 12, IPA 14, under operator supervision, can perform special processing of the data files 38 in PMPs 12. Special processing includes, but is not limited to, translation of metadata, conversion between essence file formats, watermarking of essence files, and the like.

The IPA 14 is configured to handle multiple formats for essence, metadata and service data. In addition, IPA 14 is configured to convert data between formats, as needed. More specifically, IPA 14 may process essence in different formats such as MPEG-2, WAV, J2K, and JPEG. IPA 14 may also convert essence between different formats such as from MPEG-2 to J2K and vice versa. During the conversion, input from the operator 40 or instructions from the site map 36 may be utilized. IPA 14 preferably supports metadata and essence in different formats such as, but not limited to, MXF, SMIL, and QuickTime. IPA 14 may also convert metadata between different formats such as from QuickTime to SMIL and vice versa. During the conversion, input from the operator 40 or instructions from the site map 36 may be utilized. IPA 14 is configured to support service data in the XML file format.

IPA 14 creates and extracts a PMP 12 on the fly without having to save or buffer the entire PMP 12. When creating a PMP 12, the IPA 14 locates the data files 38 to be packaged based on a purchase order and/or input from the operator 40. The IPA 14 then generates the table of contents 32 and the site map 36 for the PMP 12 based on the purchase order and/or input from the operator 40. When a PMP 12 is received, the IPAs 14 extracts the data files 38 from the PMP 12 based on PMP's table of contents 32 and the site map 36. IPA 14 may send and receive a PMP 12 on the fly without having to save or buffer the entire PMP 12. To do so, an IPA 14 may divide a given PMP 12 into multiple segments or chunks for creation, transmission, reception, extraction, and encryption.

IPA 14 verifies the integrity of PMPs 12. More specifically, IPA 14 generates redundancy checks and other digital signatures for the PMP 12 and data files 38 in the PMP 12. The IPA 14 preferably includes the redundancy checks and digital signatures in the site map 36 and/or the table of contents 32. Upon receipt of a PMP 12, the IPA 14 verifies, as needed, the integrity of the PMP 12 and data files 38 in the PMP 12 using redundancy checks and other digital signatures provided in a PMP's site map 36 and/or the table of contents 32.

IPA 14 supports the authentication of any access to the PMP 12. More specifically, IPA 14 authenticates any access or operation on the PMP 12, as needed, except for reading the table of contents 32. IPA 14 can encrypt and decrypt the data files 38 using symmetric keys. IPA 14 also encrypts and decrypts the symmetric keys using public keys. IPA 14 preferably reads and writes the encrypted symmetric keys in the site map 36 and/or table of contents 32.

IPA 14 may provide special processing and handling of PMPs 12. To do so, IPA 14 translates the metadata in a PMP's table of contents 32 and site map 36 to a specific XML or database schema, and vice versa. Input from the operator 40 may be needed during the translation. IPA may watermark essence files for forensic tracking based on instructions from the site map and/or the operator 40. The IPA 14 may also modify and personalize access permissions and directory hierarchies associated with a PMP 12, as needed.

It should be noted that IPA 14 may be implemented in hardware, software, or a combination of hardware and software. For example, a robust IPA 14 would require a server class system from a single CPU system with direct attached storage to a more robust multi-processor blade system with high speed fiber attached storage. A smaller capability IPA 14 may be implemented on a laptop computer though its ability to support applications (e.g., on the fly conversion of MPEG-2 to J2K) would be limited.

Figure 4:
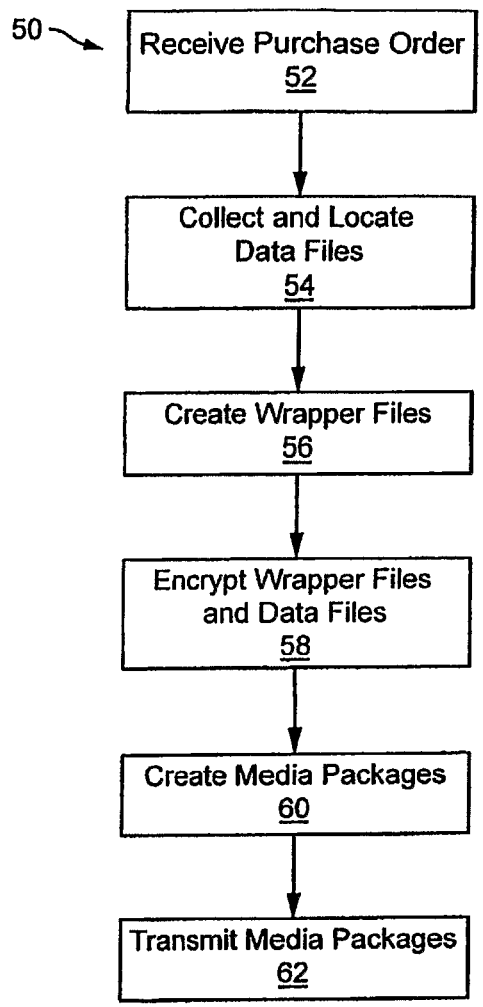
FIG. 4 is a flowchart of an exemplary portable media packet generation and transportation process according to an aspect of the present invention.

Referring now to FIG. 4, a flowchart of an exemplary PMP generation and transportation process is shown. Initially, at step 52, a purchase or work order (e.g., a request for a VFX shot) is received at a facility (e.g., post house 22). The purchase order may be received electronically over the network 42 or may be manually inputted by the operator 40. Next, at step 54, IPA 14 locates and collects the data files 38 (i.e., essence data, metadata, and service data files) needed to fulfill the purchase order (e.g., the background plates, metadata and work description for the VFX shot). Then, at step 56, IPA 14 creates the wrapper files for the PMP by generating a table-of-contents file 32 and a site map file 32 based on the purchase order and/or input from the operator 40. Afterwards, at step 58, the IPA 14 includes redundancy checks and digital signatures in the site map file and/or table-of-contents file and encrypts the site map file 36 and data files 38, as needed. Finally, at step 60, the IPA 14 archives or combines the data and wrapper files into a PMP 12 and, at step 62, transmits the PMP 12 to another facility (e.g., VFX house 20) to fulfill the purchase order.

Figure 5:
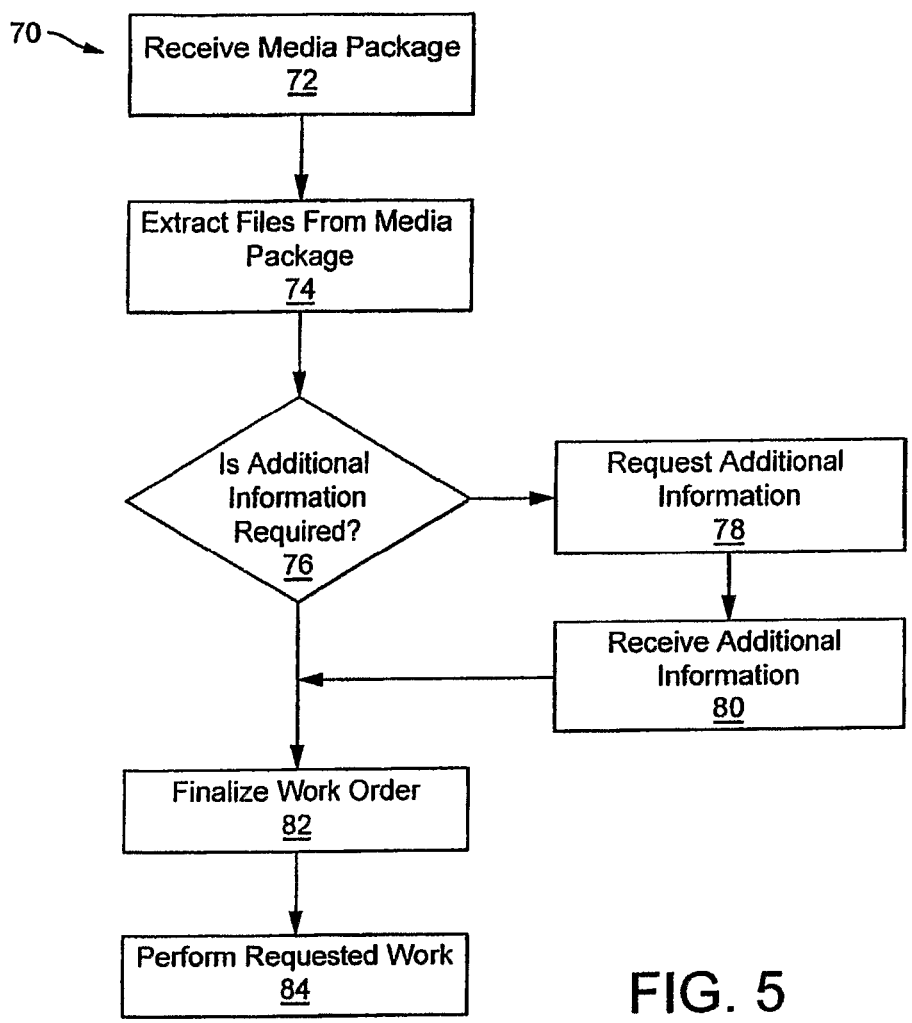
FIG. 5 is a flowchart of an exemplary portable media packet reception and extraction process according to an aspect of the present invention.

Referring now to FIG. 5, a flowchart of an exemplary PMP reception and extraction process 70 is shown. Initially, at step 72, the IPA 14 receives the transported PMP 12, and, at step 74, extracts the data files 38 from the PMP 12. More specifically, IPA 14 verifies the integrity of the received PMP 12, decrypts the site map 36 and data files 38, as necessary, and extracts the data files 38 from the PMP based on the information contained in the table of contents 32 and site map 36. The IPA 14 may also execute any instructions or actions specified in the wrapper files (e.g., watermark insertion or file conversion). Next, at step 76, the operator 40 controlling the IPA determines if the extracted essence, metadata and service files contain everything needed to process the work order or if additional information is required. If additional information is required, the operator 40, at step 78, contacts the client and requests the additional information. If no additional information was required, or once the additional information is received, the work order is finalized, at step 82, and the facility (e.g., VFX house 20), at step 84, performs the requested work (e.g., generates a VFX shot), packages or combines the completed work into a PMP 12 and transports the PMP 12 over the network 42 to the requesting facility (e.g., post house 22).

Although the embodiment which incorporates the teachings of the present invention has been shown and described in detail herein, those skilled in the art can readily devise many other varied embodiments that still incorporate these teachings. Having described preferred embodiments for a system and method for packaging and transporting essence files, metadata files and service data files using an intelligent edge device, it is noted that modifications and variations can be made by persons skilled in the art in light of the above teachings. It is therefore to be understood that changes may be made in the particular embodiments of the invention disclosed which are within the scope and spirit of the invention as outlined by the appended claims.

What is claimed is:

1. A method for generating a media package for exchanging media content between movie production facilities, the method comprising the steps of:

receiving a work order for at least one of a visual effects compositing service and a color correction service;

collecting content files and service files, said service files identifying an application to be applied to said content files, wherein said application is related to said at least one of said visual effects compositing service and said color correction service; and combining said content files and said service files into said media package, wherein said media package is used to exchange said content files and services files between said movie production facilities to accomplish said at least one of the visual effects compositing service and the color correction service in said work order.

2. The method of claim 1, wherein the step of combining further comprises the steps of:

generating command data describing how to process said content files and said service files;

encrypting said command data, said content files and said service files; and generating identification data associated with said encrypted content files and said encrypted service files.

3. The method of claim 1, wherein said content files include essence files and metadata files.

4. The method of claim 3, wherein said essence files include image files and audio files.

5. The method of claim 1, wherein said application is identified by at least one of a purchase order, a processing instruction and a service description.

6. The method of claim 1, further comprising the step of:

transmitting said media package over a network.

7. The method of claim 1, wherein the step of combining includes combining said content files and said service files into a media package having a tar archive file format.

* * * * *